United States Patent [19]

Hinkel

[11] 4,250,044
[45] Feb. 10, 1981

[54] BREAKER SYSTEM FOR HIGH VISCOSITY FLUIDS

[75] Inventor: Jerald J. Hinkel, Broken Arrow, Okla.

[73] Assignee: The Dow Chemical Company, Midland, Mich.

[21] Appl. No.: 919,336

[22] Filed: Jun. 26, 1978

[51] Int. Cl.³ .............................................. E21B 43/26
[52] U.S. Cl. .................................. 252/8.55 R; 166/308
[58] Field of Search ......................... 252/8.55 R, 316; 166/283, 308; 536/88

[56] References Cited

U.S. PATENT DOCUMENTS

| | | | |
|---|---|---|---|
| 3,002,960 | 10/1961 | Kolodny | 252/8.55 X |
| 3,509,113 | 4/1970 | Monagle et al. | 526/303 X |
| 3,779,914 | 12/1973 | Nimerick | 252/8.55 |
| 3,960,736 | 6/1976 | Free et al. | 252/8.55 |
| 3,974,077 | 8/1976 | Free | 252/8.55 |
| 4,021,355 | 5/1977 | Holtmyer et al. | 252/8.55 |
| 4,144,179 | 3/1979 | Chatterji | 252/8.55 |

OTHER PUBLICATIONS

House, *Chemical Reviews*, vol. 62, 1962, pp. 185-203.

*Primary Examiner*—Herbert B. Guynn
*Attorney, Agent, or Firm*—Burke M. Halldorson; L. Wayne White

[57] ABSTRACT

A tertiary amine/persulfate breaker system is disclosed which effects complete breaks of polysaccharide based water-gels or fluids in the ambient temperature range. Induction time may be controlled over wide permissible limits. The invention claims improved compositions and methods, particularly advantageously applied to the treatment and stimulation of shallow oil and gas wells (formation temperatures from about 50° to 125° F.).

21 Claims, No Drawings

BREAKER SYSTEM FOR HIGH VISCOSITY FLUIDS

BACKGROUND OF THE INVENTION

The invention is concerned with intentionally and desirably varying the viscosity of a fluid or semi-fluid so that it may at one time possess a high viscosity value, e.g., high capacity for suspending particulate materials, and at a subsequent time have a reduced viscosity value, e.g., lower capacity for suspending such materials. There are a number of industrial operations wherein it is desirable that the capacity of a liquid to suspend and later to drop out or permit settling of a particulate material suspending therein be controlled.

Exemplary of the field of use of controlled viscosity fluids includes applications as drilling fluids, as water flooding fluids, as carrier fluids in sand control operations such as emplacement of a gravel pack or consolidated gravel pack, and the like, paticularly where low fluid loss and/or particulate transport properties are desired. Such fluids are also employed to transport solids through pipelines, and the like.

Of particular interest to the invention, and an area where need for improved viscosity control fluids exists, is in the practice of fracturing subterranean formations. In these applications, characteristically a fracturing fluid (usually a liquid, although some gas may be present), having granular insoluble particulate material suspended or slurried therein, is injected down a well penetrating the formation and forced back into the formation (employing the height of the hydraulic head of the liquid to provide pressure and hence commonly known as hydraulic fracturing). Through the instrumentality of such operation, the formation is caused to crack or fracture thereby effectuating improved communication between the recoverable fluid (e.g., oil, gas, water, etc.) in the formation and the well. Fracturing is customarily conducted by employing oil, water, (sometimes in a thickened or gelled state) or an emulsion thereof which has suspended therein particles which are substantially insoluble in the liquid and the fluids of the formation, at least a portion of the particles thereby being forced to lodge in the fractures created, thus propping open the fractures when the fracturing pressures are subsequently released and the well put back into production.

State of the art variable viscosity fracturing fluids or water-gels are frequently less than satisfactory for application to the special case of relatively low temperature oil and gas reservoirs (defined as from about 50° to 125° F.). For example, as the gelling agent or viscosity builder concentration is increased, the water-gel or fracturing fluid requires extended times to effect a complete break. The delay caused by the inability to effect a rapid and complete break under relatively cool reservoir conditions, disadvantageously extends the well clean-up time, i.e., retraction of the water-gel or fracturing fluid from the well bore, and in some cases inhibits a satisfactory clean-up operation. Consequently, the art has tended to favor modified techniques which are designed using light viscosity fracturing fluids to circumvent or partially circumvent the unsuitable nature of the more viscous, frequently crosslinked gels or fluids. Such modified techniques produce the undesirable result of a lowering of the permissible proppant concentration, coupled with the need for substantially increased pumping rates. Recent studies have shown that the importance of high total proppant volume in good stimulation treatments and the importance of controlling pumping rates for good fracture height control. Accordingly, there exists a clear need for improved fluids possessing improved low temperature breaking characteristics, and which are thus more suitable for the above and similar applications.

SPECIFIC PRIOR ART BREAKER SYSTEMS

The use of ammonium and alkali metal persulfates to break viscous water-gels and fluids is not of itself new. Systems describing these chemicals for this use are found, for example, in U.S. Pat. Nos. 3,167,510 and 3,816,151. However, it is known and well delineated in the literature that such systems are essentially inactive or inefficient at ambient temperatures. Consequently, since efficient activity by known persulfate breaker systems requires temperatures as high as 140° F. (about 60° C.), the required temperature limitations are such as to conclude lack of satisfactory utility in the field of interest to the invention.

Terms

The term "water-based fluid" whenever used herein means an aqueous fluid of water, brine, sea water, etc., having added thereto a thickening agent or viscosity builder.

"Water-gel" whenever used herein means a class of "viscous water-based fluids" wherein the viscosity builder is cross-linked. Such water-gels at very high viscosity may tend to exhibit only semi-fluid like properties.

"Breaker" whenever used herein refers to chemical additives to viscous water-based fluids, the characteristic properties of which are to effect a complete break of the fluid after a delayed period of time.

"Complete break", as described particularly with respect to fracturing fluids, refers to the desired viscosity reduction of a viscous water-based fluid to about 10 centipoise or less, as measured by the test conditions given below or by a comparable test.

SUMMARY OF THE INVENTION

One aspect of the invention is a method for promoting the reduction of the viscosity of viscous water-based fluids maintained at temperatures within the range of from about 50° F. to about 125° F. (about 10°–50° C.), comprising providing in the fluid, a polysaccharide thickening agent, and as a breaker, a persulfate plus a tertiary amine (the terms including in scope precursors of the recited breaker compounds).

Another aspect of the invention is such a water-based fluid containing an effective amount of the above-recited breaker to reduce the viscosity of the fluid after a preselected period of time at the aforementioned temperature.

A third aspect of the invention relates to a method of treating a subterranean formation penetrated by a borehole wherein the static temperature of the borehole adjacent said formation is within said temperature range, by contacting the formation with such a water-based fluid, and thereafter by means of the recited breaker, breaking the fluid to a reduced viscosity once its intended purpose as a viscous fluid has been served. Specific applications in the art of well treating include those hereinabove discussed under the "Background" discussion. When employed as a fracturing fluid, the fluid is injected at a rate and pressure sufficient to fracture the formation. Also, at least a portion, i.e., stage, of the fracturing fluid contains a propping agent and/or diverting agent which is transported into the fracture.

A fourth aspect of the invention is a method of transporting finely divided, substantially water-insoluble particulate using such a water-based fluid containing the recited breaker, as the carrier medium for transporting particulate from one point to another, e.g., in placing proppant in a subterranean fracture, in placing gravel in a well gravel pack, in transporting coal particles, ore particles, and other particulate through pipelines, and the like.

The viscous water-based fluid may contain other well-known ingredients such as fluid loss agents (which may comprise adding to the aqueous fluid, a liquid hydrocarbon, or, particulate fluid loss agents such as silica flour, resins and the like), corrosion inhibitors, antifoaming and demulsifying agents, weighting agents, diverting agents, propping agents and the like.

FURTHER DETAILED DESCRIPTION OF THE INVENTION

The aqueous medium employed may be fresh water, a natural or synthetic brine or sea water as illustrative only. Oxygen demand by the breaker system (if any) is inherently contributed to by the breakdown of the persulfate. Thus, residual oxygen, of the inherent amount in the distilled water samples tested, below, did not demonstrate a need for incorporating or dissolving further oxygen by deliberate means in the medium, although the invention does not rule out such practice.

The viscosity builder or thickening agent or gelling agent used within the scope of the invention is based on the addition of a polysaccharide to the aqueous medium. Polysaccharides which may be employed in the practice of the present invention include natural occurring polysaccharides which are dispersible in cold or hot water to produce viscous solutions. Also included are polysaccharides in water-soluble or water-swellable forms, which are the derivatives or modifications of natural occurring polysaccharides, e.g, celluloses and various gums, which in their natural form are substantially insoluble in water.

One group of polysaccharides which is within the scope of the invention are the industrial gums such as those generally classified as exudate gums, seaweed gums, seed gums, microbial polysaccharides; and hemicelluloses (cell wall polysaccharides found in land plants) other than cellulose and pectins. Included by way of specific example are xylan, mannan, galactan, L-arabino-xylans, L-arabino-D-glucurono-D-xylans; 40-methyl-D-glucurono-D-xylans, D-gluco-D-mannans; D-galacto-D-mannans and arabino-D-galactans, algin, such as sodium alginate, carrageenin, fucordan, laminaran, agar, gum arabic, gum ghatti, gum karaya, tamarind gum, tragacanth gum, guar gum, locust bean gums and the like. Modified gums such as carboxyalkyl derivatives (e.g. carboxymethyl guar and hydroxyalkyl derivatives, e.g. hydroxypropyl guar) can also be employed. Modified celluloses and derivatives thereof can also be employed. There are thus literally thousands of such materials which have varying properties that can be employed in the practice of the present invention, for example, cellulose ethers, esters and the like.

In general, any of the water-soluble cellulose ethers can be used in the practice of the invention. Those cellulose ethers which can be used include, among others, the various carboxyalkyl cellulose ethers, e.g. carboxyethyl cellulose and carboxymethyl cellulose (CMC); mixed ethers such as carboxyalkyl ethers, e.g. carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Most preferred polysaccharides are the galactomannans, modified or derivative galactomannans, and cellulose derivatives, examples of which are given supra.

The chemistry and materials involved in the preparation of polysaccharide water-based fluids and water-gels of the type above specified is well understood in the art. Representative teachings incorporated by reference into this specification, in this respect, include U.S. Pat. Nos. 2,767,167; 3,058,909; 3,634,237; 3,727,688; 3,766,984; 3,779,914; 3,960,736; and 3,974,077. The '077 patent, for example, teaches a preferred mode of preparing crosslinked, polysaccharide water-gels of especially useful properties for use in the fluid or hydraulic oil and gas well fracturing methods contemplated by the invention. Alternately, the invention may employ non-crosslinked fluids such as prepared by the preferred mode illustrated in the Examples below.

As is well understood, the amount of thickening agent employed in the aqueous solution depends on the desired working viscosity of the solution. Since with very high viscosity fluids, it is difficult to reliably and meanfully quantitate viscosity, especially as applies to high viscosity water-gels, the requirements are best expressed in terms of concentration of the thickening agent. Thus depending on the application, generally from about 20 to about 100 pounds of the thickening agent per 1000 gallons of aqueous solution is employed (about 2.4 to about 12 kg/m$^3$). About 40–60 pounds thickening agent per 1000 gallons fluid (4.8–7.2 kg/m$^3$) is most preferable for the improved fracturing fluids contemplated by the invention.

The pH of the water-gel or water-based fluid is critically between about 7–12, and most critically between about 8–11. Water-gels (crosslinked) are fluids which tend to inherently obey this condition since frequently crosslinking is reversible if the fluid is adjusted to an acid pH. Typical chemical additives developed for crosslinked fluid systems, have necessarily recognized the pH factor, and thus, the invention is generally compatible with this class of additives (not, however, ruling out the need for running compatibility tests). Crosslinked gels may oppositely require the addition of a suitable base to adjust the pH to within the critical range specified.

The breaker comprises an effective amount of water or partially water-soluble compound(s) containing at least one functional tertiary amine group. The amine is utilized with an effective amount of ammonium persulfate, the most preferred combination, or an alkali metal persulfate. Neither the amine or persulfate is effective, if present alone, in the temperature range embraced by the invention, with the persulfate alone showing what is characterized as essentially no practical activity in the ambient temperature range, and inefficient activity at the very upper part of the range, i.e., 125° F. (about 50° C.).

The p$K_a$ of the conjugate acid of the amine (14-p$K_b$) selected for use as the breaker is required to be generally close or greater in value than the pH of the water-based fluid in order to show suitable activity at ambient and near ambient temperatures. Since amines are conventionally considered basic, this requirement is expressed in the corresponding p$K_b$ value for purposes of illustrating the invention.

Thus, generally, the p$K_b$ is required to be in the critical range of about 2-9. At the extremes of this limit, very fast and alternately slow breaking action for test specimens is observed, for example, at ambient room temperature conditions. Consequently, the break time may be tailored to effect time controlled breaks over a widely permissible time frame by selecting the amine based on its p$K_b$ value, and/or by making suitable adjustments to the pH of the water-based fluid or water-gel. Break times may be adjusted, for example, to provide controlled breaks in as little as 1 hour or less, or breaking may be delayed to occur as late as 30 hours or more following the introduction of the breaker into the fluid.

For fracturing applications, the p$K_b$ of the amine is selected within the range of about 2-7, and most ideally within the range of about 3-5. Certain tertiary amines, such as identified and as formulated in the Examples below, thus effectuate complete breaks of the especially high viscosity water-gels specified within the desired range of about 2-8 hours, as is characteristically of main importance for this specific type of application.

The compositions and methods described are not generally ultra-sensitive to small variances in proportions. Thus, the compositions are ideally suited to field requirements, which generally are not designed to achieve the exacting preciseness of laboratory formulations.

The amount of breaker employed is that amount required to reduce the viscosity of a given water-based fluid at a temperature within from about 50° F. (about 10° C.) to about 125° F. (about 50° C.), to a preselected lower viscosity or to a "complete break", as most desired, within a desired period of time. The optimum or effective amount of breaker employed depends on factors such as the induction period desired, amine solubility factor, the particular thickening or gelling agent and its concentration, the particular breaker combination, the formation temperature, and pH and p$K_b$ factors as discussed supra. Thus, the nature of the invention does not lend itself to a precise statement of a sharply defined operable concentration range for the breaker combination. Typically, however, from about 1/10 gal to about 5 gallons of liquid amine is employed per 1000 gallons of fluid (about 0.1-5 l/kl). For solids, the typical operational amine concentration is corresponding from about 1 to about 40 pounds of amine per 1000 gallons of fluid (about 0.12-4.8 kg/kl). The upper limit in each case, as well as with the persulfate concentration below, is determined principally by economic factors. Most preferably, the amine is present at a concentration of from about ½ to about 2 gallons per 1000 gallons (about 0.5-2 l/kl), or as expressed for solids, from about 4 to about 16 pounds per 1000 gallons (about 0.48-1.9 kg/kl).

The corresponding amount of persulfate present, while not subject to a precise statement, and depending on the similar factors expressed above, will, however, typically be satisfactorily employed within the range of about ¼ to about 20 pounds per 1000 gallons of fluid (about 0.03-2.4 kg/kl). Most preferably, a persulfate concentration from about ½ to about 10 pounds per 1000 gallons (0.06-1.2 kg/kl) is suitably employed to obtain satisfactory breaks within the general temperature and time limitations imposed by fracturing applications. The amine, in the typical applications contemplated, is preferably used in proportions of about 2 to 6 mols for each mol of persulfate, again the optimum proportion depending on the conditions of a specified application, and thus not ruling out possible exceptions applicable to the recited range.

EXAMPLES

The following examples further illustrate the practice of the present invention. All viscosities are determined at 100 rpm on a Fann 35 viscometer using the R-1/B-1 rotor/bob combination with a medium spring, and are reported in centipoise. Temperatures are reported in degrees Fahrenheit. All percentages are percent by weight of distilled water. Weights typically are expressed in pounds or gallons per 1000 gallons of fluid, and also in laboratory scale quantities. Each sample is prepared in 500 ml quantities, or substantially 500 ml quantities and the proportions by weight given assume a 500 ml sample. The laboratory test data given cannot be expected to correlate exactly with field experience, as for example, the factor of the cooling effect the fluid may have on a formation is not adequately treated in the laboratory test procedures, but nevertheless is of good value in judging the relative performances of the samples tested.

Thickening agent compositions used most frequently in the Examples, below, are:

| | |
|---|---|
| Composition (A) | by weight, 80% hydroxypropyl guar, 6.7% sodium acetate, 3.3% citric acid, 3.5% magnesium oxide, and silica flour to 100% |
| Composition (B) | by weight, 97.45% hydroxypropyl guar, 0.15% ammonium pentaborate, 0.4% calcium oxide, 2.0% fumaric acid, silica flour to 100% |
| Composition (C) | high viscosity guar blended with from 0.2-0.5 weight % silica flour |
| Composition (D) | hydroxyethyl cellulose, trade designation "Natrosol 250 HHW" from Hercules |

Example Series I—Continuous Mix Formulation

To 495 ml of 1% KCl aqueous solution are added 5 ml of 3.6% aqueous boric acid, several drops of trade designation polyglycol P4000 antifoamer (Dow Chemical), from 0.12-0.48 grams (2-8 lb/1000 gal) of ammonium persulfate, and 3.0 grams (50 lb/1000 gal) of Composition (A). After at least 10 seconds, but before crosslinking occurs, 0.5 ml (1 gal/1000 gal) of triethanolamine (hereinafter TEA) is added. The solution is subsequently mixed for 1 minute at 6000 rpm on a Waring blender, after which the gel is permitted to further crosslink under quiet conditions, raising the pH of the resulting water gel ultimately to above 8.5. Samples are removed at intervals from a constant temperature bath, and evaluated. The results are given in Tables I and I(A), below:

TABLE I

| Sample No. | Amine Concentration (ml/500 ml) | Persulfate Concentration (g/500 ml) | Initial Time |
|---|---|---|---|
| 1-1 | 0.5 | 0.12 | 9:10 |
| 1-2 | 0.5 | 0.24 | 9:35 |
| 1-3 | 0.5 | 0.36 | 9:40 |
| 1-4 | 0.5 | 0.48 | 9:50 |

TABLE I(A)

| TIME | Sample 1-1 75° F. | Sample 1-1 90° F. | Sample 1-2 75° F. | Sample 1-2 90° F. | Sample 1-3 75° F. | Sample 1-3 90° F. | Sample 1-4 75° F. | Sample 1-4 90° F. |
|---|---|---|---|---|---|---|---|---|
| 10:00 | g[a] | g | g | g | g | g | g | g |
| 10:15 | g | g | g | g | g | g | g | g |
| 10:30 | g | g | g | g | g | g | g | t |
| 10:40 | g | g | g | g | g | g | g | 30 |
| 11:00 | g | g | g | g | g | t | t | 6 |
| 11:05 | g | g | g | g | g | 30 | 150 | — |
| 11:10 | g | g | g | g | g | 15 | 75 | — |
| 11:20 | g | g | g | g | g | 12 | 30 | — |
| 11:30 | g | g | g | g | g | 9 | 15 | — |
| 12:15 | g | g | g | g | 9 | 42 | — | 6 | — |
| 1:00 | g | g | g | — | 9 | — | — | — |
| 1:20 | g | t[b] | g | — | — | — | — | — |
| 2:00 | g | 120 | t | — | — | — | — | — |
| 2:40 | g | 105 | 27 | — | — | — | — | — |
| 3:30 | g | 27 | 9 | — | — | — | — | — |
| 4:45 | g[c] | 6 | — | — | — | — | — | — |

[a]"g" denotes water gel is strong, i.e., flips back when poured
[b]"t" denotes gel is thinning but is too viscous to measure on the Fann 35
[c]Sample No. 1-1 broke to 20 cps overnight at 75° F.

Example Series II—Batch Mix Formulation to 490 ml of 1% aqueous KCL are added 5 ml of 3.6% aqueous boric acid, from 0.24–0.48 grams (4–8 lbs/1000 gal) of ammonium persulfate, and 2.4 grams (40 lbs/1000 gal) of Composition (B). The ingredients are mixed at 6000 rpm's in a Waring blender, and allowed to stand for at least an additional 13–15 minutes to allow proper gel hydration. Five ml of an aqueous solution consisting of from 0.5–1.0 ml (1–2 gal/1000 gal) of TEA, and the remainder 2% NaOH in aqueous solution are added. Following crosslinking by the NaOH activator, the resulting water-gels are evaluated for break time under varied temperature conditions, the results being reported in Table II, with the samples identified as follows:

| Sample No. | Description |
|---|---|
| 2-1 | Amine @ .5 ml/500 ml, persulfate @ 0.48 g/500 ml |
| 2-2 | Amine @ .5 ml/500 ml, persulfate @ 0.36 g/500 ml |
| 2-3 | Amine @ .5 ml/500 ml, persulfate @ 0.24 g/500 ml |
| 2-4 | Amine @ 1.0 ml/500 ml, persulfate @ 0.48 g/500 ml |
| 2-5 | Amine @ 1.0 ml/500 ml, persulfate @ 0.36 g/500 ml |
| 2-6 | Amine @ 1.0 ml/500 ml, persulfate @ 0.24 g/500 ml |

TABLE II

| Sample No. | Temperature | Break Time | Viscosity at Break Time |
|---|---|---|---|
| 2-1 | 110° F. | 33 min | 11 |
| 2-2 | 110° F. | 43 min | 8 |
| 2-3 | 110° F. | 62 min | 12 |
| 2-1 | 90° F. | 69 min | 15 |
| 2-2 | 90° F. | 90 min | 12 |
| 2-3 | 90° F. | 194 min | 10 |
| 2-1 | 80° F. | 115 min | 14 |
| 2-2 | 80° F. | 184 min | 10 |
| 2-3 | 80° F. | 300 min | 10 |
| 2-4 | 110° F. | 20 min | 10 |
| 2-5 | 110° F. | 33 min | 11 |
| 2-6 | 110° F. | 47 min | 14 |
| 2-4 | 90° F. | 32 min | 16 |
| 2-5 | 90° F. | 66 min | 14 |
| 2-6 | 90° F. | 106 min | 14 |
| 2-4 | 80° F. | 45 min | 14 |
| 2-5 | 80° F. | 117 min | 12 |
| 2-6 | 80° F. | 140 min | 15 |

Example Series III—Concentration Study at 120° F.

Batch mix samples are prepared, using 9 minutes hydration time, and otherwise as specified in the procedure of the Example Series II. The several examples of this experiment employ the following proportions which together with the results of the tests are shown in Table III.

TABLE III
(at 120° F.)

| Sample No. | Time (Initial and at Each Sampling) | Viscosity | Δ Time (HRS:MIN) |
|---|---|---|---|
| 3-1[a] | 10:20 (Initial) | — | — |
|  | 12:30 | 90 | 2:10 |
|  | 1:05 | 105 | 2:45 |
|  | 2:10 | 33 | 3:50 |
|  | 2:50 | 15 | 4:30 |
| 3-2[b] | 10:30 | — | — |
|  | 11:45 | 180 | 1:15 |
|  | 11:50 | 132 | 1:20 |
|  | 12:00 | 60 | 1:30 |
|  | 12:30 | 21 | 2:00 |
|  | 12:50 | 15 | 2:20 |
| 3-3[c] | 10:45 | — | — |
|  | 11:20 | 45 | 0:35 |
|  | 11:30 | 15 | 0:45 |
|  | 11:40 | 8 | 0:55 |
|  | 11:45 | 5 | 1:00 |

[a]490 ml of 1 percent aqueous KCl, 5 ml of 3.6% aqueous boric acid, 2.4 g (40 lbs/1000 gal) Composition (B), 0.3 grams (½ lb/1000 gal) ammonium persulfate, 0.5 ml (1 gal/1000 gal) TEA, and 4.5 ml of 2 percent aqueous NaOH
[b]same as Sample No. 3-1, except contains .06 g (1 lb/1000 gal) ammonium persulfate
[c]same as Sample No. 3-1, except contains 0.12 g (2 lb/1000 gal) ammonium persulfate

Example Series IV—Composition (C)

Several high viscosity water-gels (cross-linked) are prepared essentially in accordance with the practice of Example Series II. The specific recipes and results are reported in Table IV, below:

TABLE IV

| Sample No. | Time (Initial and at Each Sampling) | Viscosity | Δ Time (HRS:MIN) |
|---|---|---|---|
| 4-1[a] | 9:20 | — | — |
| | 11:20 | 54 | 2:00 |
| | 11:30 | 33 | 2:10 |
| | 12:15 | 15 | 2:55 |
| 4-2[b] | 9:25 | — | — |
| | 11:10 | 180+ | 1:45 |
| | 11:30 | 36 | 2:05 |
| | 12:45 | 21 | 3:20 |
| 4-3[c] | 10:15 | — | — |
| | 11:10 | 180+ | 0:55 |
| | 11:30 | 180+ | 1:15 |
| | 12:15 | 18 | 2:00 |

(Ambient Temp.)

[a]495 ml of 1% KCl, 2 ml of 3.6% boric acid, 0.24 g (4 lbs/1000 gal) ammonium persulfate, 2.4 grams (40 lbs/1000 gal) Composition (C), 9 minutes hydration time, followed by the addition of 0.5 ml (1 gal/1000 gal) TEA and 2 ml of 2% aqueous NaOH.
[b]Same as Sample No. 4-1, except substituting 0.25 ml (½ gal/1000 gal) TEA and 2.25 ml of 2% NaOH solution.
[c]Same as Sample No. 4-1, except substituting 1.0 ml 12 gal/1000 gal) TEA.

Example Series V—Uncross-Linked Fluids

A series of uncross-linked fluids is prepared by admixing with 500 ml of a 1 percent KCl aqueous solution, a thickening agent, optionally several drops of a defoaming agent, and varying amount of ammonium persulfate, as identified more specifically below. The solutions are each mixed in a Waring blender at 6000 rpm's for 1 minute, and then allowed to hydrate, after which triethanolamine is added to initiate breaking action. The procedure is followed except for Sample No. 5-3, where the addition of the amine precedes the addition of the thickening agent without showing apparent adverse effects. The omission of a boric acid cross-linking agent in this series of examples produces an essentially uncross-linked fluid. The results are tabulated in Table V, below:

TABLE V (At 72°–78° F.)

| Sample No. | pH | Time | Viscosity | Δ Time (Hrs:Min) |
|---|---|---|---|---|
| 5-1[a] | 9.3 | 12:50 (initial) | 57 | — |
| | | 3:30 | 30 | 2:40 |
| | | 8:00 | 5 | 7:10 |
| 5-2[b] | 9.1 | 12:55 (initial) | 57 | — |
| | | 2:10 | 36 | 1:15 |
| | | 4:45 | 15 | 3:50 |
| | | 8:00 | 3 | 7:05 |
| 5-3[c] | 9.0 | 1:00 (initial) | 54 | — |
| | | 2:10 | 24 | 1:10 |
| | | 3:30 | 9 | 2:30 |
| 5-4[d] | 8.6 | 10:30 (initial) | — | — |
| | | 10:35 | 81 | 0:05 |
| | | 11:30 | Broken | 1:00 |
| 5-5[e] | — | 10:15 (initial) | 90 | — |
| | | 11:20 | 15 | 1:05 |

[a]500 ml 1% KCl 3.0 g (50 lbs/1000 gal) composition (A), 0.24 g (4 lbs/1000 gal) ammonium persulfate, several drops of polyglycol P4000 antifoamer, 0.5 ml of 80:20 TEA/H₂O (.8 gal/1000).
[b]Same as Sample No. 6-1, except using 0.36 g (6 lbs/1000 gal) persulfate.
[c]Same as Sample No. 6-1, except using 0.48 g (8 lbs/1000 gal) persulfate.
[d]Same as Sample No. 6-3, except substituting composition (C) with 0.5 ml (1 gal/1000 gal) TEA.
[e]500 ml 1% KCl, 2.4 g (40 lbs/1000 gal) composition (D), 1.0 ml (2 gal/1000 gal) TEA.

Example Series VI—pH

A series of hydroxypropyl guar uncross-linked fluid samples is prepared, using HCl to adjust the final pH of the various samples over the range 8.7, 8.1, 6 and 4, respectively. Each sample includes as the breaker, at 0.5 ml/500 ml (1 gal/1000 gal), and ammonium persulfate at 0.24 grams/500 ml (4 lbs/1000 gal) TEA. The samples are evaluated for break time at 78° F., and the results are reported in Table VI. As will be observed, the breaker system operates effectively with respect to basic samples, showing little or no activity with respect to acidic samples.

TABLE VI

| Sample pH | Time | Viscosity | Δ Time (Hrs:Min) |
|---|---|---|---|
| 8.7 | 1:15 | 54 | 0 |
| | 1:55 | 41 | 0:40 |
| | 2:25 | 30 | 1:10 |
| | 2:50 | 23 | 1:40 |
| | 3:20 | 18 | 1:05 |
| | 3:45 | 12 | 2:30 |
| | 4:20 | 10 | 3:05 |
| 8.1 | 1:30 | 54 | 0 |
| | 2:00 | 50 | 0:30 |
| | 2:30 | 42 | 1:00 |
| | 2:50 | 37 | 1:20 |
| | 3:20 | 35 | 1:40 |
| | 3:45 | 29 | 2:15 |
| | 4:20 | 25 | 2:50 |
| | 9:10 | 6 | 7:40 |
| 4 | 1:45 | — | 0 |
| | 2:00 | 54 | 0:15 |
| | 2:25 | 54 | 0:40 |
| | 2:50 | 52 | 1:05 |
| | 3:20 | 51 | 1:35 |
| | 3:50 | 51 | 2:05 |
| | 4:20 | 50 | 2:35 |
| | 9:15 | 48[a] | 7:30 |
| 6 | 1:55 | — | 0 |
| | 2:02 | 55 | 0:07 |
| | 2:30 | 54 | 0:35 |
| | 2:50 | 54 | 0:55 |
| | 3:20 | 53 | 1:25 |
| | 3:50 | 53 | 1:55 |
| | 4:20 | 53 | 2:25 |
| | 9:15 | 47[a] | 7:20 |

[a]No acceptable break. Compositions considered unsuitable.

Example Series VII—pK$_b$

A series of amines of widely varying pK$_b$ values (range of from about 3–9) are employed with the water-gel composition identified in Table VII. Activity of the amine is shown to be correlated to the amine basicity, permitting a widely permissible range of tailoring of the fluid break time to the needs of a given application. Break times vary essentially between about 1–30 hours in the illustrated series of examples below.

TABLE VII

| Sample No. | Basic Fluid Type | Breaker | Test Temp | Break Time (Hrs) |
|---|---|---|---|---|
| 7-1 | Composition A/ Cross-linked | 0.2 ml/500 ml 12/5 gal/1000 gal di-methylaminopropio-nitrile (DMAPN), 0.3 g (5 lbs/1000 gal) TEA | Ambient | 3-5 |
| 7-2 | Composition B/ Cross-linked | 1.0 ml/500 ml 12 gal/1000 gal) DMAPN, 0.48 g (8 lbs/1000 gal) TEA | 50° F. | 2¼ |
| 7-3 | Composition A/ Cross-linked | 0.5 g/500 ml (8½ lbs/1000 gal) 1,10,phenan-throline, 0.48 g/ 500 ml (8 lbs/ 1000 gal) TEA | 74° F. | 8-23[a] |
| 7-4 | Composition A/ Cross-linked | 0.5 ml/500 ml (1 gal/1000 gal) N-methylmorpholine/ 0.48 g (8 lbs/1000 lbs) TEA | 74° F. | Less than 1 hr. |
| 7-5 | Composition A/ Cross-linked | N,N dimethylbenzyl-amine/TEA, proportions as in Sample No. 7-4 | 74° F. | 7-22[a] |
| 7-6 | Composition A1 Cross-linked | Pyridine/TEA proportions as in Sample No. 7-4 | 74° F. | 25-30 |

[a] Overnight break

Example Series VIII—Low Amine Concentration

A series of cross-linked water-gels are prepared for testing, under ambient temperatures, except substituting in the formulations, extremely low amine concentrations. Sample No. 8-1 of this series is prepared using the method and proportions specified for Sample No. 2-3, supra, except with a reduced amount of 0.05 ml/500 ml (1/10 gal/1000 gal) of TEA in the recipe. Corresponding Sample Nos. 8-2 and 8-3 of this series are prepared with 0.1 ml/500 ml (2/10 gal/1000 gal) and 0.15 ml/500 ml (3/10 gal/1000 gal) of TEA in their respective formulations, otherwise conforming also essentially to Sample No. 2-3. All samples of the series evidence an effective and complete break, within a 24-hour period at the ambient temperature condition.

What is claimed is:

1. A method of fracturing a subterranean formation penetrated by a borehole, wherein the static temperature of the borehole adjacent said formation is within the range of from about 50° F. to about 125° F., comprising: injecting into the borehole and into contact with the formation at a rate and pressure sufficient to fracture said formation, a water-based fluid at a pH of from about 7 to about 12 and comprising
   (a) an aqueous liquid,
   (b) as a thickening agent to increase the viscosity of the aqueous liquid, a viscosity increasing amount of a polysaccharide which is soluble or dispersible in the aqueous liquid, and
   (c) as a breaker to reduce the viscosity of the fluid after said fluid has contacted the formation and after its intended purpose as a viscous fluid has been served, the combination comprising an effective amount of (i) triethanolamine, and (ii) at least one compound selected from the group consisting of ammonium persulfates and alkali metal persulfates in at least partially water soluble form.

2. The method of claim 1 wherein said water-based fluid contains, per 1000 gallons of fluid, from about 20 to about 100 pounds of said thickening agent, from about 1/10 to about 5 gallons of triethanolamine, and from about ¼ to 20 pounds of persulfate.

3. The method of claim 2 wherein the pH of said water-based fluid is from about 8 to about 11, said breaker being present in an amount effective to promote a complete break of said fluid in less than about 8 hours following the introduction of the last component of the breaker into the fluid.

4. The method of claim 3 wherein the water-based fluid contains, per 1000 gallons of said fluid, from about ½ to about 5 gallons of triethanolamine, and about ½ to about 10 pounds of persulfate.

5. The method of claim 4 wherein the thickening agent is selected from the class consisting of galactomannans, modified and derivative galactomannans and cellulose derivatives.

6. The method of claim 5 wherein the fluid contains per 1000 gallons, about 40 to about 60 pounds of cross-linked thickening agent.

7. The method of claim 7 wherein the thickening agent is guar or hydroxypropyl guar.

8. The method of claim 7 wherein said breaker comprises ammonium persulfate.

9. A method for reducing the viscosity of a viscous water-based fluid at temperatures of from about 50° F. to about 125° F., said fluid containing a viscosity-increasing amount of a water soluble or dispersible polysaccharide, and comprising: providing in said fluid, a breaker to reduce the viscosity of the fluid which comprises an effective amount of (i) triethanolamine, and (ii) at least one compound selected from the group consisting of ammonium persulfate, and alkali metal persulfates in at least partially water soluble form.

10. The method of claim 9 wherein the thickening agent is selected from the class consisting of galactomannans and modified and derivative galactomannans, and cellulose derivatives.

11. The method of claim 10 wherein said water-based fluid contains, per 1000 gallons of fluid, from about 20 to about 100 pounds of thickening agent, from about 1/10 to about 5 gallons of triethanolamine, and from about ¼ to about 20 pounds of persulfate.

12. The method of claim 11 wherein the pH of the water-based fluid is from about 8 to about 11, said breaker being present in an amount effective to promote a complete break of said water-based fluid in less than about 8 hours, following the introduction of the last component of the breaker into the fluid.

13. The method of claim 12 wherein the thickening agent is guar or hydroxypropyl guar in cross-linked form.

14. The method of claim 13 wherein the fluid contains, per 1000 gallons, from about 40 to about 60 pounds thickening agent, about ½ to about 5 pounds triethanolamine, and about ½ to about 10 pounds of persulfate.

15. The method of claim 14 wherein said breaker comprises ammonium persulfate.

16. In a water fluid suitable for use in treating subterranean formations at temperatures within the range of from about 50°-125° F. which are penetrated by a well, said fluid being of the type containing
   (a) as a thickening agent to increase the viscosity of the fluid, from about 20 to about 100 pounds per 1000 gallons of said fluid, a water soluble or dispersible polysaccharide, and (b) a breaker to reduce the viscosity of the fluid after a period of time, the improvement which comprises: as the breaker an effective amount of (i) triethanolamine, and (ii) at least one compound selected from the group consisting of ammonium persulfate, and alkali metal persulfates in at least partially water soluble form.

17. The fluid of claim 16 wherein the thickening is selected from the class consisting of galactomannans, and modified galactomannans.

18. The fluid of claim 17 wherein the fluid contains per 1000 gallons, from about 1/10 to about 5 gallons of triethanolamine, and from about ¼ to about 20 pounds of persulfate.

19. The fluid of claim 18 containing a particulate propping agent.

20. The fluid of claim 19 containing, per 1000 gallons, about 40 to about 60 pounds of cross-linked thickening agent, about ½ gallon to 5 gallons triethanolamine, and from about ½ pound to 10 pounds of persulfate.

21. The fluid of claim 20 wherein the thickening agent is guar or hydroxypropyl guar, and said breaker comprises ammonium persulfate.

* * * * *

UNITED STATES PATENT AND TRADEMARK OFFICE
CERTIFICATE OF CORRECTION

PATENT NO. : 4,250,044
DATED : Feb. 10, 1981
INVENTOR(S) : Jerald J. Hinkel

It is certified that error appears in the above—identified patent and that said Letters Patent is hereby corrected as shown below:

Column 11, Table VII, under heading "Breaker", first line, delete "12/5" and insert -- (2/5 --;
Column 11, Table VII, under heading "Break Time (Hrs)", first line, delete "3-5" and insert -- 3-5 1/2--.

Column 11, Table VII, Sample 7-6, under heading "Basic Fluid Type", first line, delete "Al" and insert --A/--.

Column 9, Table IV, footnote (c), delete "12" and insert --(2 --.

Column 10, line 20, after "breaker" insert --TEA--.

Column 10, line 22, after "(4 lbs/1000 gal)", delete "TEA".

Column 7, Table I(A), under "Sample 1-4", underline "90°F.".

Column 7, line 33, beginning of paragraph, capitalize the word "to".

Signed and Sealed this

Fourteenth Day of July 1981

[SEAL]

Attest:

GERALD J. MOSSINGHOFF

Attesting Officer   Commissioner of Patents and Trademarks